United States Patent
Chung et al.

(10) Patent No.: US 9,069,177 B2
(45) Date of Patent: Jun. 30, 2015

(54) TWO DIMENSIONAL/ THREE DIMENSIONAL SWITCHABLE DISPLAY MODULE AND DISPLAY DEICE HAVING THE SAME

(75) Inventors: Chao-Chun Chung, Miao-Li County (TW); I-Han Liu, Miao-Li County (TW)

(73) Assignees: INNOCOM TECHNOLOGY(SHENZHEN)CO., LTD., Longhua Town, Shenzhen (CN); INNOLUX CORPORATION, Miao-Li County (TW)

( * ) Notice: Subject to any disclaimer, the term of this patent is extended or adjusted under 35 U.S.C. 154(b) by 467 days.

(21) Appl. No.: 13/524,206

(22) Filed: Jun. 15, 2012

(65) Prior Publication Data

US 2013/0335403 A1    Dec. 19, 2013

(51) Int. Cl.
G06T 15/00    (2011.01)
G02B 27/22    (2006.01)
H04N 13/04    (2006.01)

(52) U.S. Cl.
CPC ........ *G02B 27/2214* (2013.01); *H04N 13/0404* (2013.01); *H04N 13/0409* (2013.01); *H04N 13/0415* (2013.01); *H04N 13/0452* (2013.01); *H04N 13/0422* (2013.01); *H04N 13/0447* (2013.01); *H04N 2213/001* (2013.01)

(58) Field of Classification Search
CPC ........... G02B 27/2214; H04N 13/0404; H04N 13/0409; H04N 13/0452; H04N 13/0447; H04N 13/0415; G06F 1/1628; G06F 1/1633; G06F 1/1613; G06F 1/1679; G06F 1/1637; G06F 1/1681
USPC .......................................................... 348/51
See application file for complete search history.

(56) References Cited

U.S. PATENT DOCUMENTS

| | | | | |
|---|---|---|---|---|
| 6,064,424 A | * | 5/2000 | van Berkel et al. | 348/51 |
| 2004/0169919 A1 | * | 9/2004 | Uehara et al. | 359/443 |
| 2004/0239231 A1 | * | 12/2004 | Miyagawa et al. | 313/438 |
| 2005/0259323 A1 | * | 11/2005 | Fukushima et al. | 359/462 |
| 2007/0121076 A1 | * | 5/2007 | Klippstein et al. | 353/30 |
| 2011/0084893 A1 | * | 4/2011 | Lee et al. | 345/6 |
| 2011/0164028 A1 | | 7/2011 | Naske et al. | |
| 2012/0113101 A1 | | 5/2012 | Yamamoto et al. | |

FOREIGN PATENT DOCUMENTS

| | | |
|---|---|---|
| CN | 102469326 A | 5/2012 |
| GB | 2404106 A | 1/2005 |
| WO | 0209446 A1 | 1/2002 |
| WO | 2008102366 A2 | 8/2008 |

OTHER PUBLICATIONS

EP Search Report dated Sep. 26, 2013.
TW Office Action dated Jan. 14, 2015 in corresponding Taiwan application (No. 102116007).

* cited by examiner

*Primary Examiner* — Jay Au Patel
*Assistant Examiner* — Neil Mikeska
(74) *Attorney, Agent, or Firm* — McClure, Qualey & Rodack, LLP

(57) ABSTRACT

A two dimensional/three dimensional (2D/3D) switchable display module, comprising a display panel, an optical module and a revising circuit is disclosed. The display panel has an active area. The optical module is disposed on the active area for changing a light path of a light emitting from the active area. A relative position information is between a position of the optical module and a position of the display panel. The revising circuit is used for providing a revising information based on the relative position information. The display panel receives the revising information and outputs an image corresponding to the optical module for displaying a three dimensional image.

16 Claims, 12 Drawing Sheets

S1'

| | x1 | x2 | x3 | x4 | x5 | x6 | x7 | x8 | x9 | x10 |
|---|---|---|---|---|---|---|---|---|---|---|
| y1 | V1' | V2' | V3' | V4' | V5' | V6' | V7' | V8' | V1' | V2' |
| y2 | V1' | V2' | V3' | V4' | V5' | V6' | V7' | V8' | V1' | V2' |
| y3 | V1' | V2' | V3' | V4' | V5' | V6' | V7' | V8' | V1' | V2' |
| y4 | V1' | V2' | V3' | V4' | V5' | V6' | V7' | V8' | V1' | V2' |
| y5 | V1' | V2' | V3' | V4' | V5' | V6' | V7' | V8' | V1' | V2' |
| y6 | V1' | V2' | V3' | V4' | V5' | V6' | V7' | V8' | V1' | V2' |

FIG. 7C

| Viewing angle information J | V1 | V2 | V3 | V4 | V5 | V6 | V7 | V8 |
|---|---|---|---|---|---|---|---|---|
| Viewing angle information J' | V1 | V2 | V3 | V4 | V5 | V4 | V3 | V2 |

FIG. 8A

| Viewing angle information K | V1 | V2 | V3 | V4 | V5 | V6 | V7 |
| Viewing angle information K' | V1 | V2 | V3 | V4 | V4 | V3 | V2 |

FIG. 9A

TWO DIMENSIONAL/ THREE DIMENSIONAL SWITCHABLE DISPLAY MODULE AND DISPLAY DEICE HAVING THE SAME

BACKGROUND OF THE INVENTION

1. Field of the Invention

The invention relates in general to a display module and a display device, and more particularly to a two dimensional and three dimensional switchable display module and display device.

2. Description of the Related Art

For the past few years, technologies and peripheral products for three dimensional display are developed rapidly. Three dimensional stereoscopic display provides different images to binocular vision by utilizing a parallax between human eyes. The different images are received by individual eyes, merged by the brain and be developed into a stereoscopic image.

Most of the three dimensional displays should work with a three dimensional glasses. The three dimensional glasses are costly and inconvenient to users. Naked eye three dimensional (naked eye 3D) technology is then produced to solve the problem. The main types of naked eye 3D display are lenticular lens type and parallax barrier type.

The lenticular lens type display use lens to separate light propagation path. The separated light emits to the left eye and the right eye separately and induces human brain to generate stereoscopic visual effect. The parallax barrier type display use a barrier as a light shelter. The shelter area and a light transmissible area are interlaced each other, such that the images observed by the user comprises a separated left eye image and a separated right eye image and can be merged by human brain.

FIG. 1 illustrates a schematic diagram of a conventional three dimensional display 100. A barrier 15 is disposed in front of a display panel 11. The light emitting from a backlight module 13 passes through a light shelter area and a light transmissible area such that light of visible pixels are respectively transported to the left and right eyes. When the display panel displays different images in odds pixels and even pixels and light of odd pixels and even pixels are transported to the left eye and the right eye respectively, the left eye and the right eye see different images. Therefore, a three dimensional image can be construct by human brain.

However, neither lenticular lens type display nor parallax barrier type display requires specific alignment with display panel 11 to perform the three dimensional effect. Thus, the lenticular lens or parallax barrier need to be fixed on the display panel 11 after an accurate alignment procedure. The manufacturing cost of the three dimensional display increases due to the specific alignment procedure. Besides, since the lenticular lens or parallax barrier is fixed to the display panel 11, the transmittance of the display is reduced seriously in two dimension mode and the user can not switch the three dimensional display effect into two dimensional display effect discretionary.

SUMMARY OF THE INVENTION

The invention is directed to a display module and a display. The module and the display comprise an optical module for switching from two dimensional display mode to three dimensional display mode.

According to a first aspect of the present invention, a two dimensional/three dimensional (2D/3D) switchable display module, comprising a display panel, an optical module and a revising circuit. The display panel having an active area is disclosed. The optical module is disposed on the active area for changing a light path of a light emitting from the active area. A relative position information is generated between a position of the optical module and a position of the display panel. The revising circuit is used for providing a revising information based on the relative position information. The display panel receives the revising information and outputs an image corresponding to the optical module for displaying a three dimensional image is provided.

According to a second aspect of the present invention, a two dimensional/three dimensional (2D/3D) switchable display device, comprising a display panel, an optical module, a revising circuit and a casing is disclosed. The display panel has an active area. The optical module is disposed on the active area for changing a light path of a light emitting from the active area. A relative position information is generated between a position of the optical module and a position of the display panel. The revising circuit is used for providing a revising information based on the relative position information. The display panel receives the revising information and outputs an image corresponding to the optical module for displaying a three dimensional image. The casing is used for accommodating the display panel, the optical module and the revising circuit.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 7C illustrates a first revised viewing angle matrix table.

FIG. 8A illustrates a diagram of another embodiment for converting and revising the viewing angle matrix.

FIG. 9A illustrates a diagram of still another embodiment for converting and revising the viewing angle matrix.

DETAILED DESCRIPTION OF THE INVENTION

Figure 1:
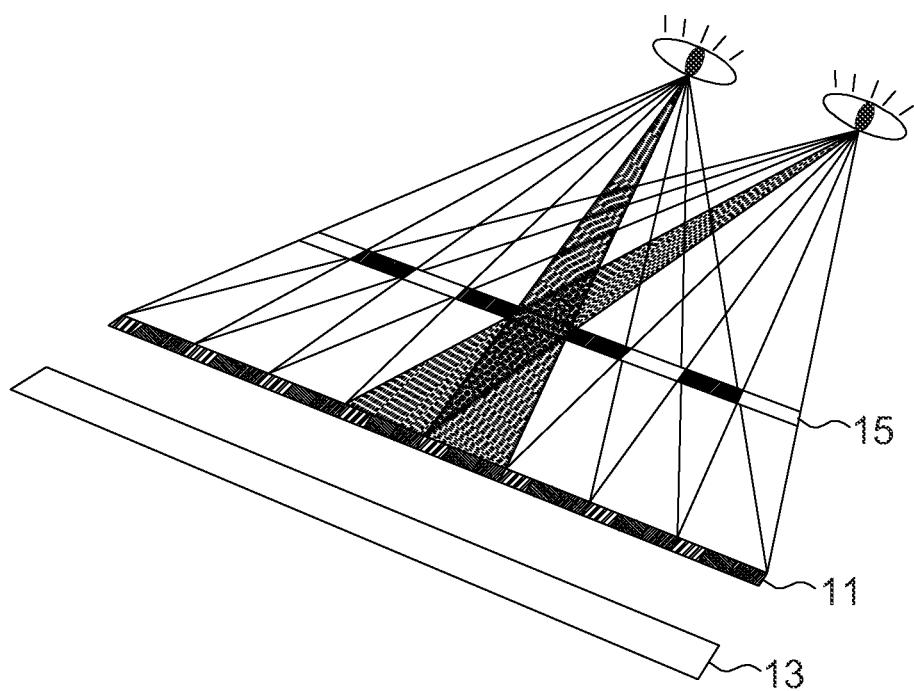
FIG. 1 (Prior Art) is a schematic diagram of a conventional three dimensional display.
Figure 2A:
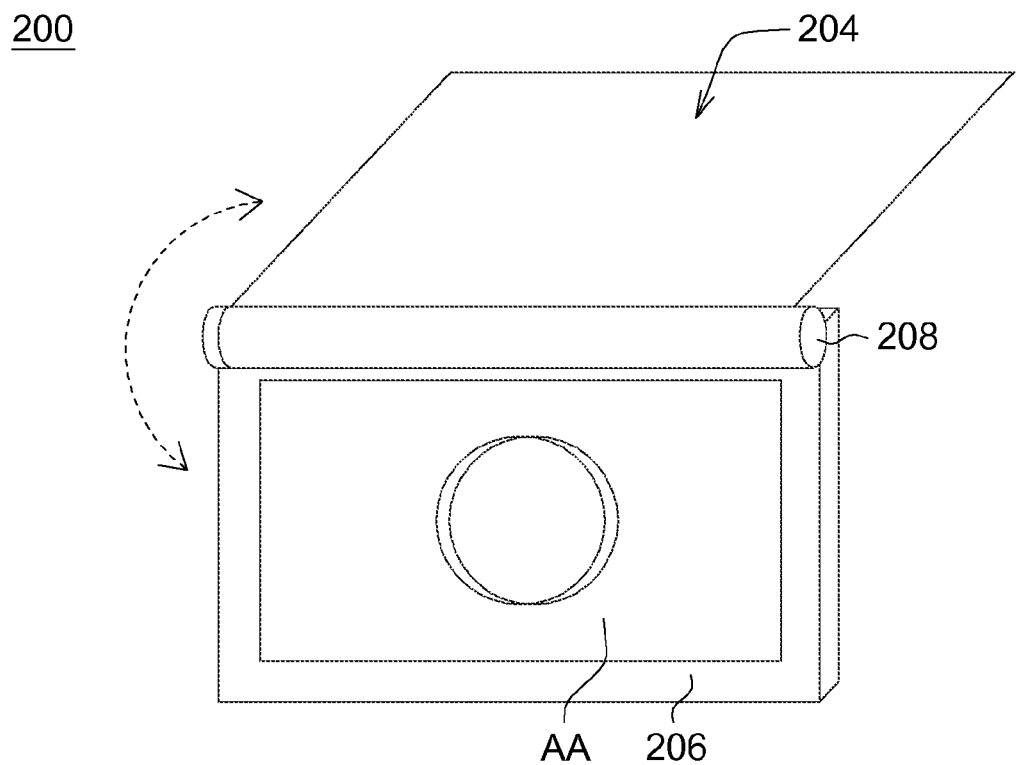
FIG. 2A~2B illustrate a display module according to one embodiment of the invention.
Figure 2B:
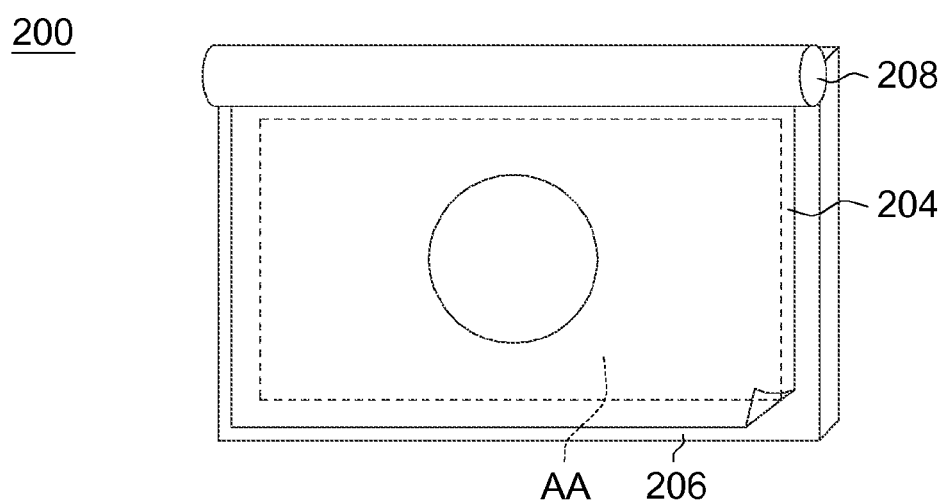

FIG. 2A~2B illustrate a display module 200 according to one embodiment of the invention. The display module 200 is a two dimensional/three dimensional (2D/3D) switchable display module and comprises an optical module 204, a display panel 206 and a revising circuit (not shown). Referring to FIG. 2A, the display panel 206 has an active area AA. The revising circuit comprises processor (such as microprocessor), measuring device, storage device (such as memory), signal generating device (such as signal generator) and adjusting device (operate automatically or operated by user). The optical module 204 can be connected to the display panel 206 through a coupling element 208, such as a pivot. The optical module 204 can rotate with respect to the display panel 206. The optical module 204 can be a flexible film (the flexible film can comprise materials such as acrylic, polyamic acid, polyacrylic acid, polyimide, polymer or plastic) or a hard plate (such as glass). The alignment accuracy is not necessary between the optical module 204 and display panel 206.

In this embodiment, the optical module 204 is a structure of flip type. The optical module 204 comprises a barrier plate or a lenticular lens array. The barrier plate can be step type, stripe type or slant type. The lenticular lens array can be a plurality of periodically arranged lenticular lens disposed over the active area AA. A configuration of the lenticular lens array is corresponding to view points and a pixel size of the display panel 206.

The optical module 204 can be detachably or fixedly mounted on one side of the display panel 206 and covers the active area AA for changing a light path of a light emitting from the active area AA. A relative position information is related to a difference between a position of the optical module 204 and a position of the display panel 206. The revising circuit (not shown) for providing a revising information based on the relative position information. The display panel receives the revising information and outputs an image corresponding to the optical module 204 for displaying a three dimensional image.

Referring to FIG. 2A, when the optical module 204 uncovers the display panel 206, the display module 200 can be used as a two dimensional display device. Referring to FIG. 2B, when the optical module 204 covers the display panel 206, the display module 200 can be used as a three dimensional display device. In other words, the optical module 204 moves relatively to the display panel 206 to cover or uncover the display panel 206 for switching between the two dimensional/three dimensional (2D/3D) mode. For this embodiment, the transmittance of the display module 200 in two dimension mode is much higher than original 2D/3D switchable display module. In one embodiment, the optical module 204 is detachably mountable to the display panel 206 so that the user can easily dismount the optical module 204 from the coupling element 208. The optical module 104 can be coupled to the display panel 106 by magnetic force, glue or other adhesive or fixing element.

The measuring device measures an alignment difference between the optical module 204 and the display panel 206 and generates a relative position information. The storage device has n initial viewing angle matrix, each of the initial viewing angle matrix has m positions. A corresponding viewing angle information can be written-in the m positions. The initial viewing angle matrix with written-in viewing angle information are saved as viewing angle matrix tables (shown in FIG. 7B). When a number of viewing angles is eight, the storage device saves eight viewing angle matrix table as tables S1~S8. The viewing angle matrix tables S1~S8 comprises repeatedly arranged eight viewing angles of an image. Each of the viewing matrix tables S1~S8 contains an arrangement of different viewing angle information.

Figure 7A:
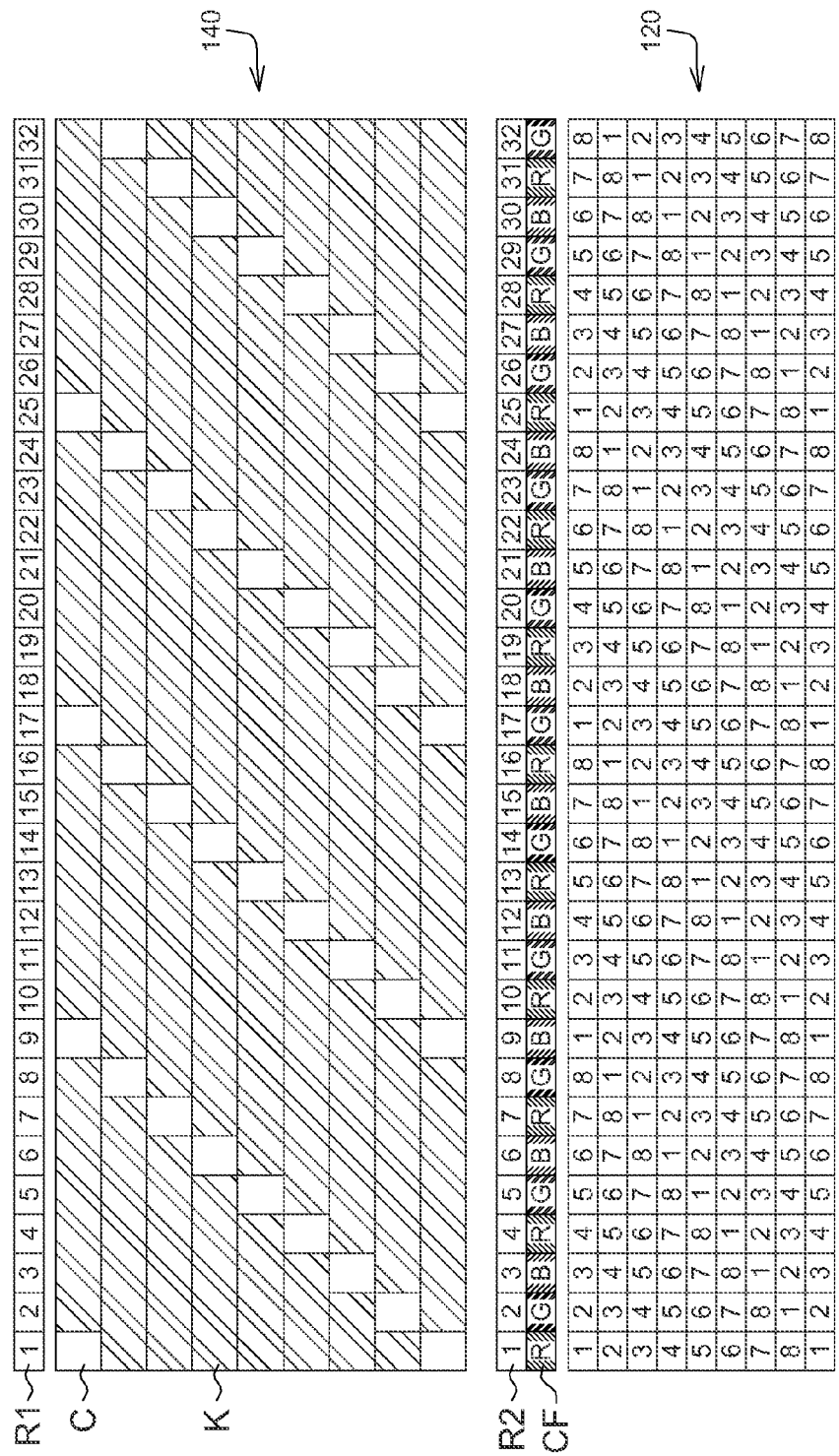
FIG. 7A illustrates a table of information stored in a display panel and a pattern of barrier type optical module corresponding to the display panel.

FIG. 7A illustrates a table of information stored in a display panel and a pattern of barrier type optical module corresponding to the display panel. Referring to FIG. 7A, an eight viewing angles display module is shown. A light transmissible area C and a shelter area K are interlaced with each other and formed a periodic step pattern. Position R1 represents an absolute position of the light transmissible area and the barrier. The position R2 represents a corresponding position of the pixel information stored in the display panel. The color layer CF represents colors of red (R), green (G) and blue (B) which correspond to the pixel information.

Figure 7B:
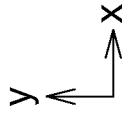
FIG. 7B illustrates a diagram of algorithm tables and N viewing angle matrix tables.

FIG. 7B illustrates algorithm tables NM1~NM8 and n viewing angle matrix tables S1~S8. The signal generating device receives the relative position information and refers the design of the optical module 204 (shown in FIG. 2) to generate algorithm tables NM1~NM8. The number of algorithm tables NM1~NM8 is the same as the number of the viewing angles. The size of algorithm tables NM1~NM8 and the size of n viewing angle matrix tables S1~S8 are related to a resolution of the display device. FIG. 7B merely shows parts of the content in the algorithm tables and parts of the content in the viewing angle matrix tables.

Referring to FIG. 7B, each of the N viewing angle matrix tables having M positions that corresponds to M pixel information. The number N is an integral larger than 2, and the number of N is the same as the number of the viewing angles. The number of M is an integral larger than N or equal to N. In this embodiment, eight algorithm tables NM1~NM8 are generated since there are eight viewing angles. The eight algorithm tables NM1~NM8 correspond to viewing angle matrix table S1~S8 respectively. Each of the algorithm tables NM1~NM8 contains a plurality of weighting information.

The pixel matrix information of N viewing angles is obtained as a sum of products of viewing angle information and corresponding weight information. The viewing angle information are stored in each N viewing angle matrix tables. The N viewing angle matrix tables comprises N viewing angle information arranged repeatedly, the corresponding weight information is in one of N algorithm tables. The algorithm tables NM1~NM8 comprises a plurality of weighting information. The weighting information is related to the optical module.

The method of filling up viewing angle information into the viewing angle matrix tables is described below. As shown in FIG. 7B, a first viewing angle matrix table can be obtained by filling a viewing information of the $F^{th}$ column of the $F^{th}$ viewing frame into the $(F+zN)^{th}$ column of a first initial viewing angle matrix. A second viewing angle matrix table can be obtained by filling a viewing information of the $F^{th}$ column of the $(F+1)^{th}$ viewing frame into the $(F+zN)^{th}$ column of a second initial viewing angle matrix. A third viewing angle matrix table can be obtained by filling a viewing information of the $F^{th}$ column of the $(F+2)^{th}$ viewing frame into the $(F+zN)^{th}$ column of a third initial viewing angle matrix. Following the above procedures, until filling a viewing information of the $F^{th}$ column of the $N^{th}$ viewing frame into the $(F+zN)^{th}$ column of $F^{th}$ initial viewing angle matrix to obtain the $N^{th}$ viewing angle matrix tables. In one embodiment, F is an integral from 1 to N, z is an integral larger than 0 or equal to 0. The upper limit of z is related to a resolution of the display device.

In particular, the weighting information are related to the configuration of the light shelter area and a light transmissible area. In this embodiment, the sum of the weighting information in the same positions of each algorithm tables is not larger than 1. In particular, the sum of weighting information in each of the algorithm tables NM1~NM8 corresponds to 0.89+0.11+ . . . +0, and the sum is less than 1. The adjusting device can instruct the processor to compute the sum of the product of the viewing angle information and the corresponding weighting information, and adjust the original signal from the signal generating device to a revised pixel matrix information of eight viewing angle signal. In one embodiment, the weighting information of algorithm tables NM1~NM8 can be adjusted by user, the adjusted weighting information should follow the rule described herein, such as the sum of the weighting information in the same positions of each algorithm tables is not larger than 1.

FIG. 7C illustrates a first revised viewing angle matrix table S1'. The pixel V1' at coordinate (c1, d1) of the first revised viewing angle matrix table S1' is a product of a weighting information at coordinate (x1, y1) in algorithm table NM1 and a viewing angle information at coordinate (x1, y1) in viewing angle matrix table S1, plus a product of a weighting information at coordinate (x1, y1) in algorithm table NM2 and a viewing angle information at coordinate (x1, y1) in viewing angle matrix table S2 . . . plus the following sum of products regularly, until a product of a weighting information at coordinates (x1, y1) of the last viewing angle matrix table S8 and a viewing angle information at coordinate (x1, y1) of in the last algorithm table NM8 have been added. Then, the summarized value of the pixel V1' equals to 0.89× v1+0.11×v2+ . . . +0×v8 can been obtained.

In this embodiment, the information of each of the pixels comprises a product summarization of more than one viewing angle information and different weighting information. The revised pixel information can improved the stereoscopic effect of the display device and reduce the uncomfortable feeling of the observer, when the observer watching the three dimensional image on the display device.

Another embodiment for converting and revising the viewing angle matrix is disclosed in FIG. 8A. The viewing angle information J represents viewing angle information before converting. The viewing angle information J' represents viewing angle information after converting. When the number of viewing angle is even, a viewing angle information of the $G^{th}$ column of $G^{th}$ viewing angle frame is written-in a $(G+zN)^{th}$ column of a first viewing angle matrix. The viewing angle next to half the number of viewing angle is selected as a converting column, the viewing angle information after the converting column are gradually decreased when converting. The viewing angle information of the $(N-H+2)^{th}$ column of the $(N-H+2)^{th}$ frame is written-in the $(H+zN)^{th}$ column of the first initial viewing angle matrix. The number G is an integral from 1 to (N/2)+1, the number H is an integral from (N/2)+2 to N, the number z is an integral larger than 0 or equal to 0, and an upper limit of the number z is related to the resolution of the frame image.

As shown in FIG. 8A, for example, when the number of viewing angle is eight, the converting column is $$\left(\frac{8}{2}\right) + 1 = 5.$$

Thus, the viewing angle information V5 is taken as a converting column, and viewing angle information after the viewing angle information V5 gradually decreased when converting. That is to say, viewing angle information V6 is converted into viewing angle information V4, viewing angle information V7 is converted into viewing angle information V3, and viewing angle information V8 is converted into viewing angle information V2. By selecting a central column of the number of viewing angles as the converting column and converting the viewing angle information, the gigantic jumping between viewing angle information V8 and viewing angle information V1 can be avoided and thereby reduce the uncomfortable feeling to the observer.

Figure 8B:
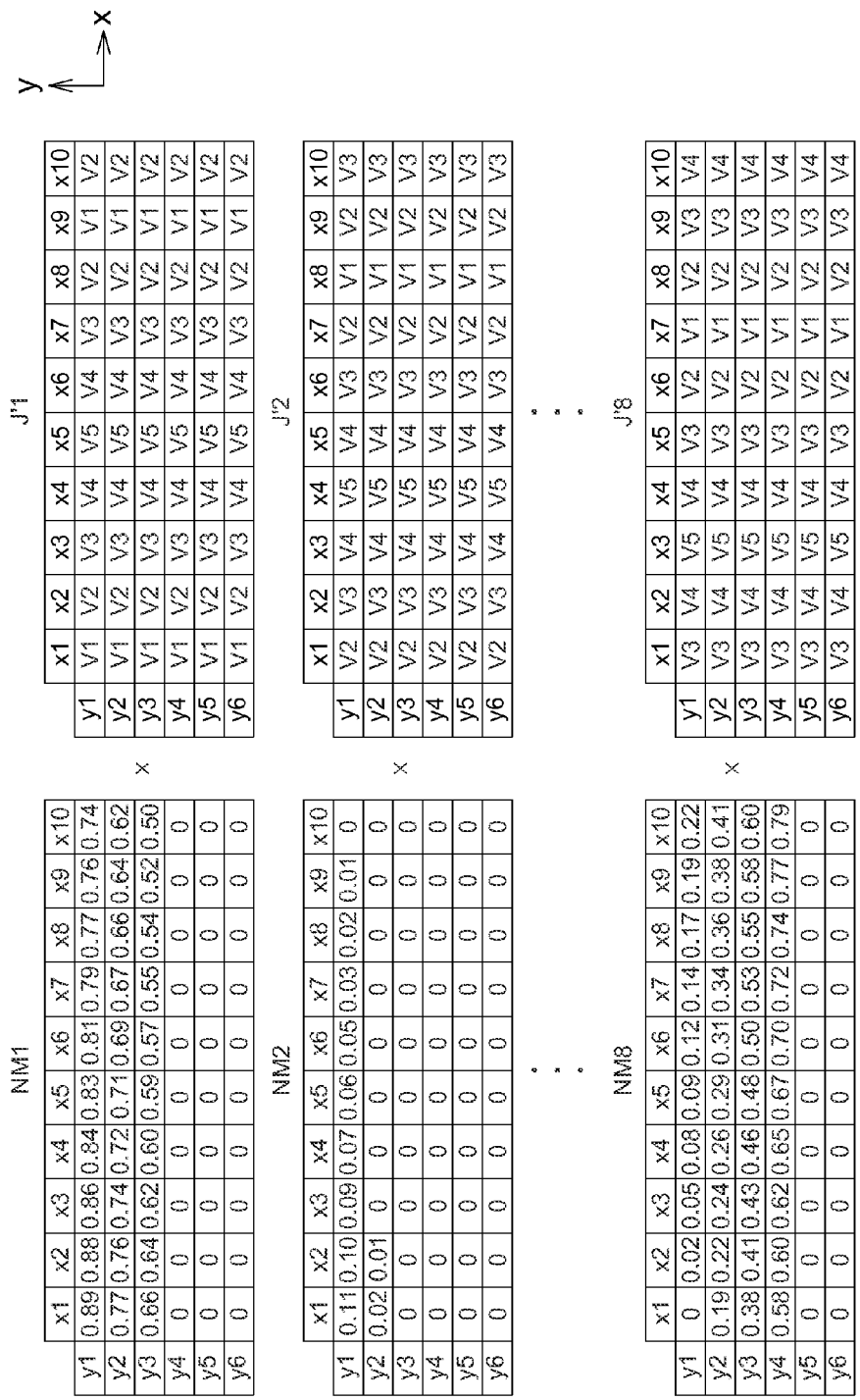
FIG. 8B illustrates the algorithm tables and the viewing angle matrix tables according to another embodiment.

FIG. 8B illustrates the algorithm tables NM1~NM8 and the viewing angle matrix tables J'1~J'8. The weighting information saved in the algorithm tables NM1~NM8 is the same as the weighting information saved in the algorithm tables NM1~NM8. The difference between the viewing angle matrix tables J'1~J'8 and the viewing angle matrix tables S1~S8 is that the viewing angle information to be stored in the viewing angle matrix tables J'1~J'8 and the viewing angle matrix tables S1~S8 are different. The viewing angle matrix tables J'1~J'8 can be obtained by utilizing the viewing angle information J' in FIG. 8A to replace the corresponding viewing angle information in FIG. 7B. Then, the processor computes a sum of each the viewing angle information in viewing angle matrix tables J'1~J'8 and the corresponding weighting information to output a revised pixel information matrix of eight viewing angle.

Still another embodiment for converting and revising the viewing angle matrix is disclosed in FIG. 9A. The viewing angle information K represents a viewing angle information before converting. The viewing angle information K' represents a viewing angle information after converting. When the number of viewing angle is odd, a viewing angle information of the $G^{th}$ column of $G^{th}$ viewing angle frame is written-in the $(G+zN)^{th}$ column of a first viewing angle matrix. A viewing angle next to half the number of viewing angle is selected as a converting column, the viewing angle information after the converting column are gradually decreased when converting. The viewing angle information of the $(N-H+2)^{th}$ column of the $(N-H+2)$ frame is written-in the $(H+zN)^{th}$ column of the first initial viewing angle matrix. The number G is an integral from 1 to (N+1)/2+1, the number H is an integral from (N+1)/2+1 to N, the number z is an integral larger than 0 or equal to 0, and an upper limit of the number z is related to the resolution of the frame image.

For example, as shown in FIG. 9A, when the number of viewing angle is seven, the converting column is $$\frac{(7+1)}{2} = 4.$$

The viewing angle information V4 is taken as a converting column. During the conversion, the viewing angle information after the viewing angle information V4 are gradually decreased. That is to say, the viewing angle information V5 is converted into viewing angle information V4. The viewing angle information V6 is converted into viewing angle information V3. The viewing angle information V7 is converted into viewing angle information V2.

Figure 9B:
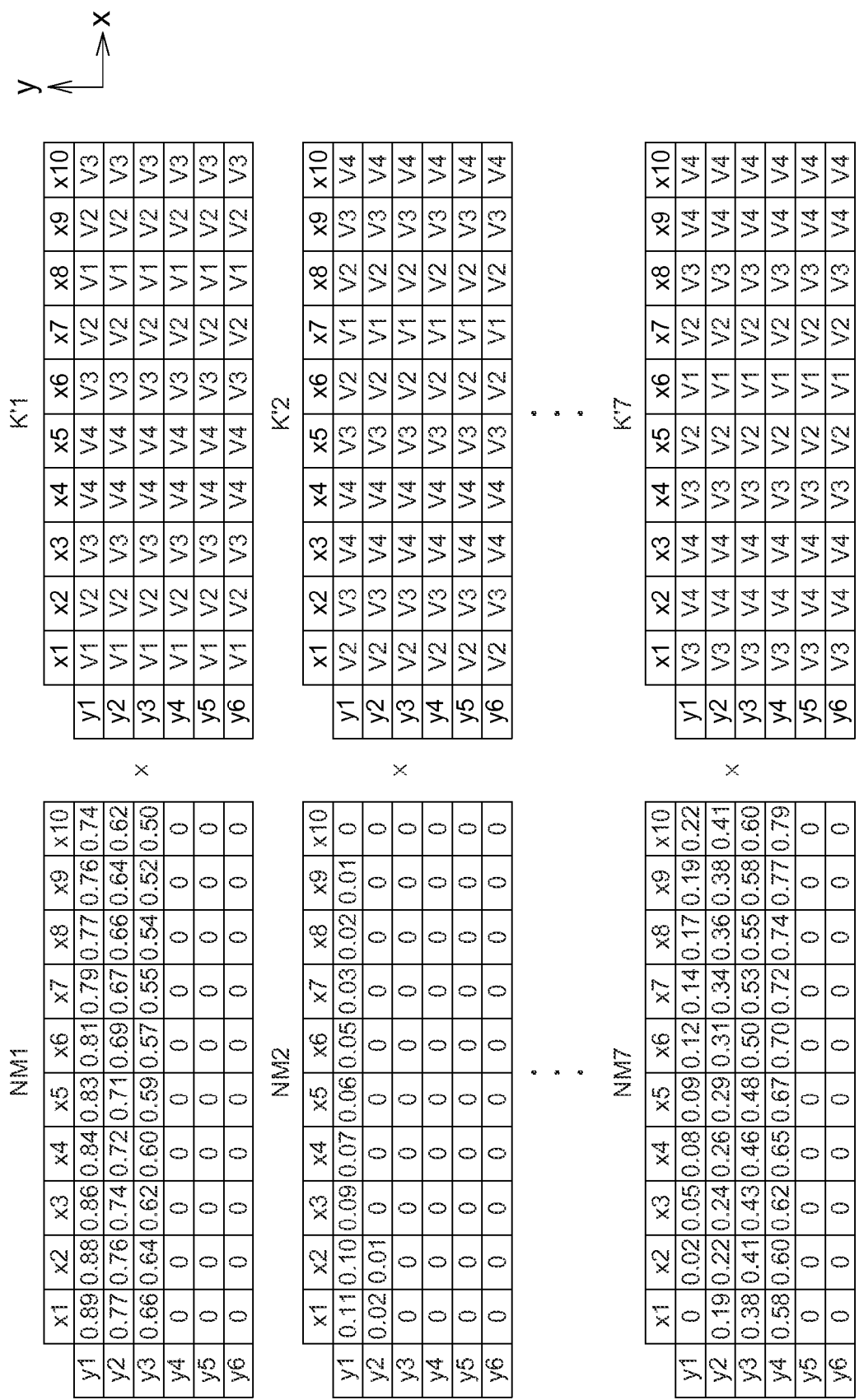
FIG. 9B illustrates the algorithm tables and the viewing angle matrix tables according to still another embodiment.

FIG. 9B illustrates the algorithm tables N1'~N8' and the viewing angle matrix tables K'1~K'7. The weighting information saved in the algorithm tables NM1~NM7 is the same as the weighting information saved in the algorithm tables NM1~NM7. The difference between the viewing angle matrix tables K'1~K'7 and the viewing angle matrix tables S1~S7 is that the viewing angle information to be stored in the viewing angle matrix tables K'1~K'7 and the viewing angle matrix tables S1~S7 are different. The viewing angle matrix tables K'1~K'7 can be obtained by utilizing the viewing angle information K' in FIG. 9A to replace the corresponding viewing angle information in FIG. 7B. Then, the processor computes a sum of each of the viewing angle information in viewing angle matrix tables K'1~K'7 and the corresponding weighting information to output a revised pixel information matrix of eight viewing angle.

By utilizing the central column of the number of viewing angle as a converting column and gradually decreased the viewing angle information when converting, the gigantic jumping between the viewing angle information V7 to the viewing angle information V1 and the uncomfortable feeling of the observer can be reduced.

Figure 3A:
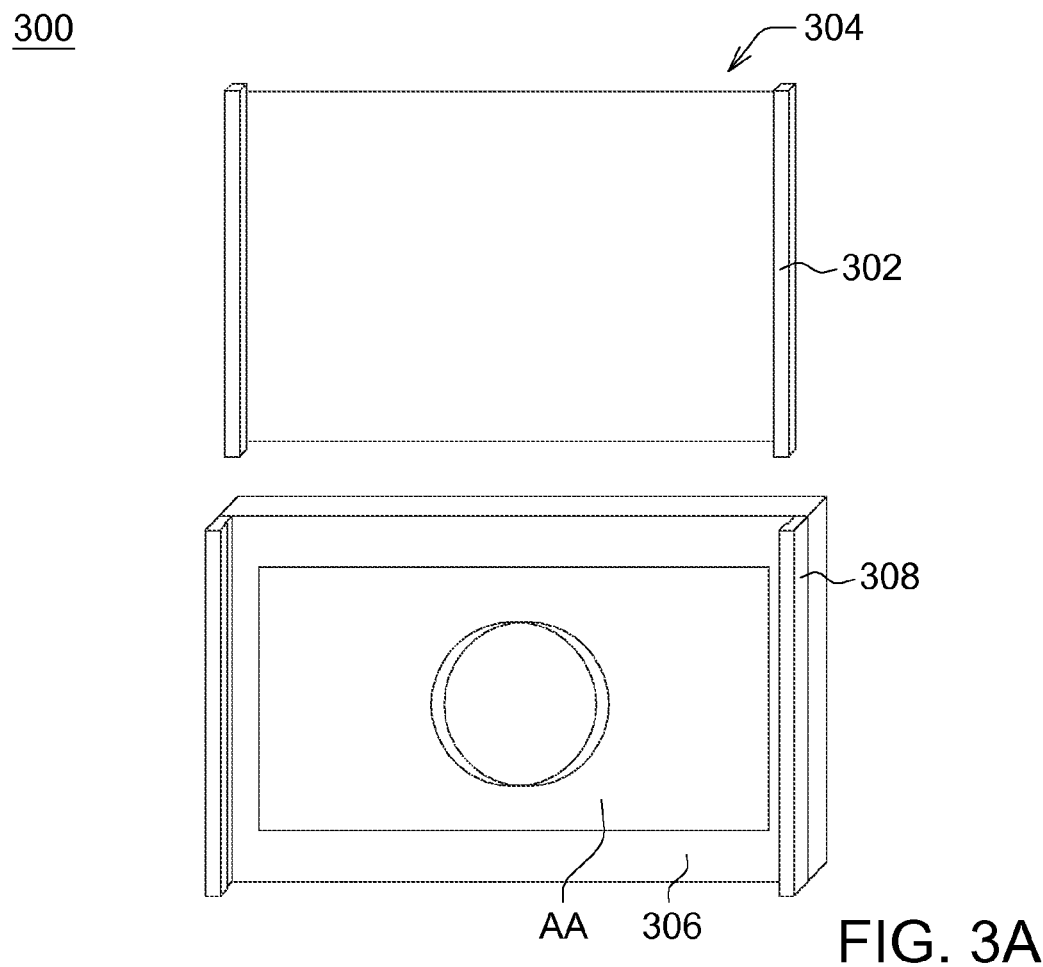
FIG. 3A~3B illustrate a display module according to another embodiment of the invention.
Figure 3B:
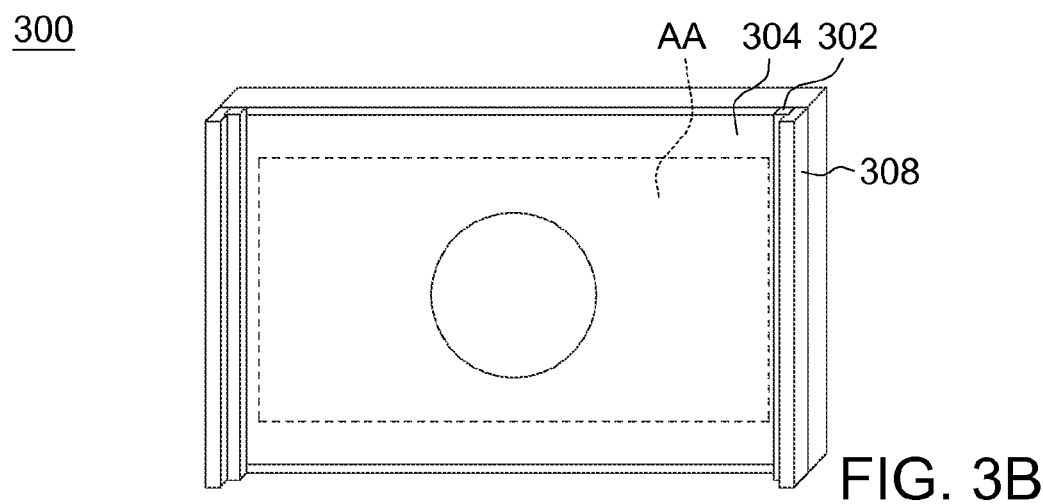

FIG. 3A~3B illustrate a display module 300 according to another embodiment of the invention. Referring to FIG. 3A, the display module 300 is a two dimensional/three dimensional (2D/3D) switchable display module and comprises an optical module 304, a display panel 306 and a revising circuit (not shown). The display panel 306 has an active area AA and a coupling element 308, such as a sliding track. The optical module 304 has a coupling element 302, such as a bump. Referring to FIG. 3A, when the coupling element 302 slides over the coupling element 308 until the optical module 304 uncovers the active area AA of the display panel 306, the display module can display two dimensional images. Referring to FIG. 3B, when the coupling element 302 slides through the coupling element 308 until the optical module 304 covers the active area AA of the display panel 306, the display module can display three dimensional images. The optical module 304 can be a flexible film (the flexible film can comprise materials such as acrylic, polyamic acid, polyacrylic acid, polyimide, polymer or plastic) or a hard plate (such as glass).

In this embodiment, the optical module 304 is a structure of track type. The optical module 304 comprises a barrier plate or a lenticular lens array. The types and operating principles of the optical module 304 can be similar to the optical module 304. A relative position information is related to a relative position between a position of the optical module 304 and a position of the display panel 306. The revising circuit (not shown) for providing a revising information based on the relative position information. The display panel receives the revising information and outputs an image corresponding to the optical module 304 for displaying a three dimensional image.

The optical module 304 can be detachably or fixedly mounted on the display panel 306 and covers the active area AA for changing a light path of a light emitting from the active area AA. The optical module 304 moves relatively to the display panel 306 to cover or uncover the display panel 306 for switching between the two dimensional/three dimensional (2D/3D) mode. In one embodiment, the optical module 304 is detachably mountable to the display panel 306 so that the user can easily dismount the optical module 304 from the coupling element 308.

Figure 4A:
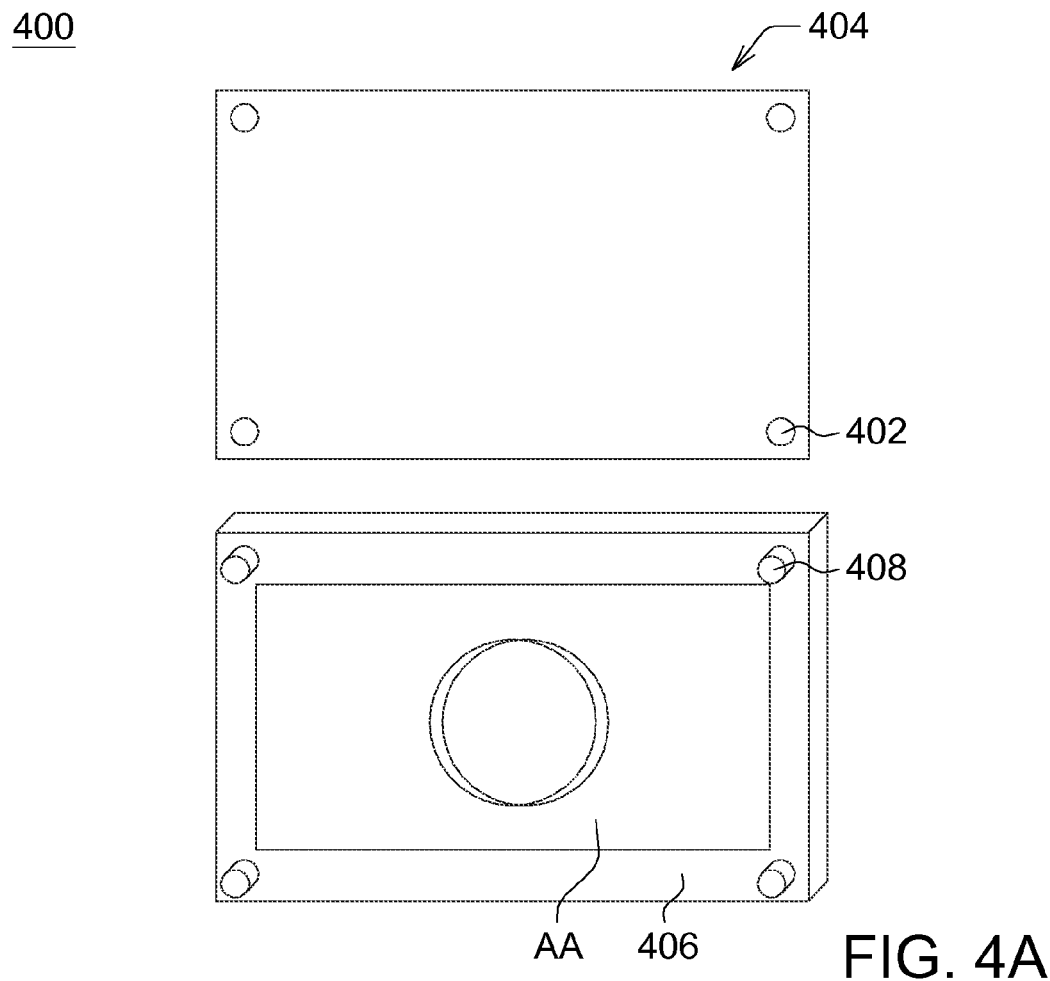
FIG. 4A~4B illustrate a display module 400 according to another embodiment of the invention.
Figure 4B:
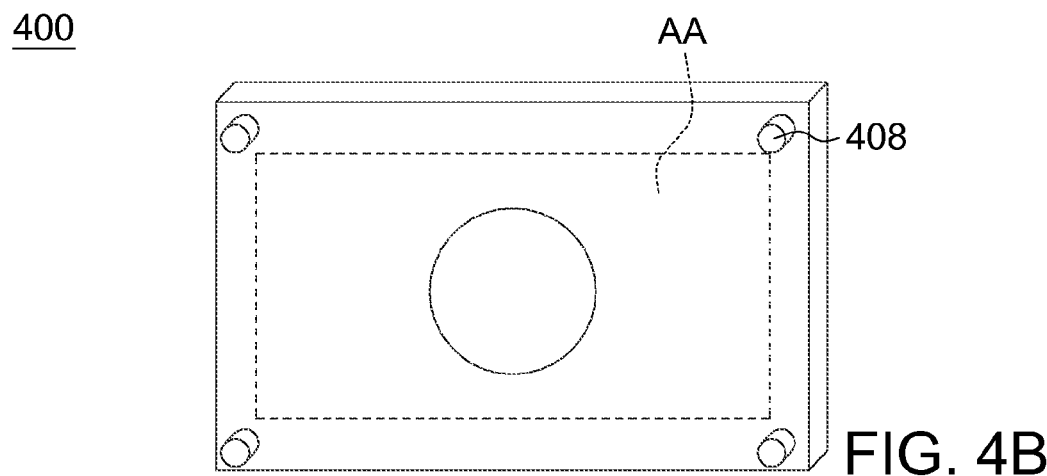

FIG. 4A~4B illustrate a display module 400 according to another embodiment of the invention. Referring to FIG. 4A, the display module 400 is a two dimensional/three dimensional (2D/3D) switchable display module and comprises an optical module 404, a display panel 406 and a revising circuit (not shown). The display panel 406 has an active area AA and a coupling element 408, such as a pillar. The optical module 404 has a coupling element 402, such as an opening.

Referring to FIG. 4A, when the coupling element 402 and the coupling element 408 are not coupled to each other and the optical module 404 uncovers the active area AA of the display panel 406, the display module 400 displays two dimensional images. Referring to FIG. 4B, when the coupling element 402 engages with the coupling element 408 so that the optical module 404 covers the active area AA of the display panel 406, the display module 400 can display three dimensional images. The optical module 404 can be a flexible film or a hard plate.

In this embodiment, the optical module 404 is a structure of hang up type. The optical module 404 comprises a barrier plate or a lenticular lens array. The types and operating principles of the barrier plate and the lenticular lens array of the optical module 404 are similar to the optical module 204. A relative position information and a revising information based on the relative position information can be generated as the method described above when referring to FIGS. 7A~7C. The display panel then receives the revising information and outputs an image corresponding to the optical module 404 for displaying a three dimensional image.

The optical module 404 can be detachably or fixedly mounted on the display panel 406 and covers the active area AA for changing a light path of a light emitting from the active area AA. The optical module 404 cover or uncover the display panel 406 for switching between the two dimensional/three dimensional (2D/3D) mode. In one embodiment, the optical module 404 is detachably mountable to the display panel 406 so that the user can easily separate the optical module 404 and the display panel 406.

Figure 5A:
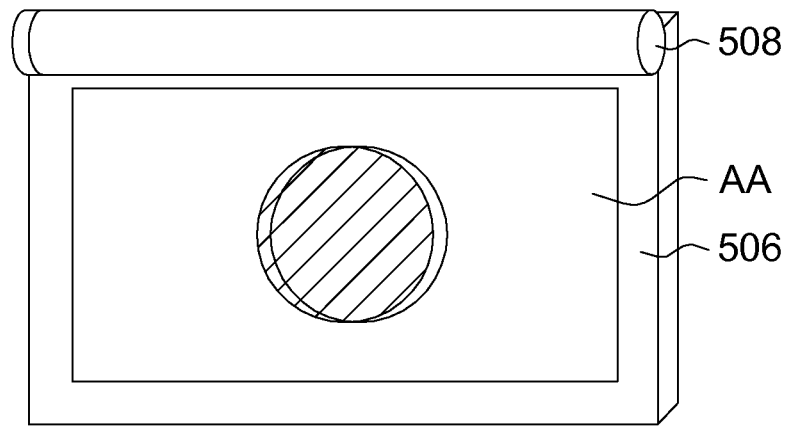
FIG. 5A~5B illustrate a display module 500 according to another embodiment of the invention.
Figure 5B:
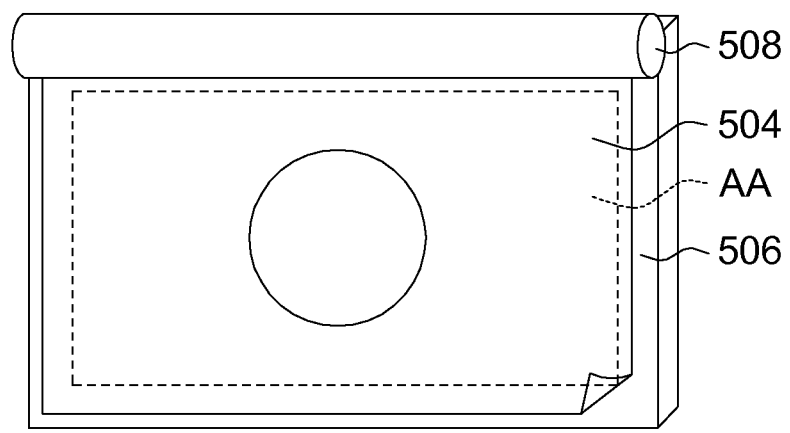

FIG. 5A~5B illustrate a display module 500 according to another embodiment of the invention. Referring to FIG. 5A, the display module 500 is a two dimensional/three dimensional (2D/3D) switchable display module and comprises an optical module 504, a display panel 506 and a revising circuit (not shown). The display panel 506 has an active area AA and a coupling element 508, such as a scroll. The scroll can receives and rolled up the optical module 504.

Referring to FIG. 5A, when the optical module 504 is rolled up by the coupling element 508, the optical module 504 uncovers the active area AA of the display panel 506 so that the display module 500 displays two dimensional images. Referring to FIG. 5B, when the optical module 504 is not rolled up by the coupling element 508 and covers the active area AA of the display panel 506, the display module 500 can display three dimensional images. In present embodiment, the optical module 504 can be a flexible film (the flexible film can comprise materials such as acrylic, polyamic acid, polyacrylic acid, polyimide, polymer or plastic).

In this embodiment, the optical module 504 is a structure of curtain type. The optical module 504 comprises a barrier plate or a lenticular lens array. The types and operating principles of the barrier plate and the lenticular lens array of the optical module 504 are similar to the optical module 204. A relative position information and a revising information based on the relative position information can be generated as the method described above when referring to FIGS. 7A~7C. The display panel 506 then receives the revising information and outputs an image corresponding to the optical module 504 for displaying a three dimensional image.

The optical module 504 can be detachably or fixedly mounted on the coupling element 508 and covers the active area AA for changing a light path of a light emitting from the active area AA. The optical module 504 cover or uncover the display panel 506 for switching between the two dimensional/three dimensional (2D/3D) mode. In one embodiment, the optical module 504 is detachably mountable to the display panel 506 so that the user can easily separate the optical module 504 and the display panel 506.

Figure 6:
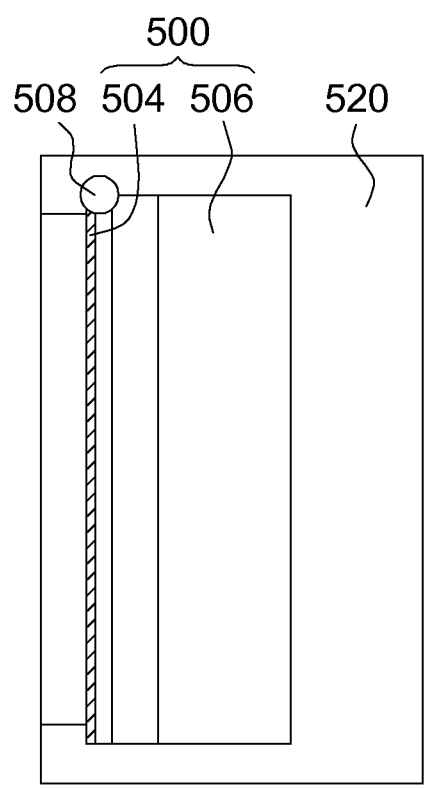
FIG. 6 illustrates vertical section of a display device 50 according to one embodiment of the invention.

FIG. 6 illustrates vertical section of a display device 50 according to one embodiment of the invention. Referring to FIG. 6, the display device 50 is a two dimensional/three dimensional (2D/3D) switchable display device and comprises a casing 520, a display module 500 and a coupling element 508. The display module 500 comprises a curtain-type optical module 504, a display panel 506 and a revising circuit (not shown). The casing 520 is used for accommodating the display panel 506, the optical module 504 and the revising circuit. In this embodiment, the coupling element 508, such as the scroll, is embedded inside the casing 520.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A two dimensional/three dimensional (2D/3D) switchable display module, comprising:
   a display panel having an active area;
   an optical module disposed on the active area for changing a light path of a light emitting from the active area, wherein a relative position information is between a position of the optical module and a position of the display panel; and
   a revising circuit for providing a revising information based on the relative position information, wherein the display panel receives the revising information and outputs an image corresponding to the optical module for displaying a three dimensional image;
   wherein the revising information is a pixel matrix information of n viewing angles, wherein n is an integral larger than 2, and
   wherein the pixel matrix information of n viewing angles is obtained from a sum of products of viewing angle information and a corresponding weight information, wherein the viewing angle information is in one of n viewing angle matrix tables, the n viewing angle matrix tables comprises n viewing angle information arranged repeatedly, the corresponding weight information is in one of n algorithm tables, the algorithm tables comprises a plurality of weighting information, the weighting information is related to the optical module.

2. The two dimensional/three dimensional (2D/3D) switchable display module according to claim 1, wherein the optical module is detachably mountable to the display panel.

3. The two dimensional/three dimensional (2D/3D) switchable display module according to claim 2, wherein the optical module is flexible and having a structure of curtain-type, track type, hang up type or flip type.

4. The two dimensional/three dimensional (2D/3D) switchable display module according to claim 2, wherein the optical module is a hard plate and having a structure of track type, hang up type or flip type.

5. The two dimensional/three dimensional (2D/3D) switchable display module according to claim 3, wherein the optical module is the curtain-type structure, and the two dimensional/three dimensional switchable display module further comprising:
   a casing for accommodating the display panel; and
   a coupling element being disposed at a corner of the casing, wherein the coupling element is used for coupling the optical module.

6. The two dimensional/three dimensional (2D/3D) switchable display module according to claim 1, wherein the optical module comprises a barrier plate or a lenticular lens.

7. The two dimensional/three dimensional (2D/3D) switchable display module according to claim 6, wherein the optical module moves relatively to the display panel for switching between the two dimensional/three dimensional (2D/3D) mode.

8. The two dimensional/three dimensional (2D/3D) switchable display module according to claim 1, wherein each of the viewing angle matrix tables comprises a plurality of positions, each of the pixel matrix information of n viewing angle matrixes comprises a value, the value is a sum of a product of one viewing angle information in a same position of each of the viewing angle matrix tables and the corresponding weighting information in each of the algorithm tables, the corresponding weighting information are different in each tables.

9. A two dimensional/three dimensional (2D/3D) switchable display device, comprising:
   a display panel having an active area;
   an optical module disposed on the active area for changing a light path of a light emitting from the active area, wherein a relative position information is between a position of the optical module and a position of the display panel;
   a revising circuit for providing a revising information based on the relative position information, wherein the display panel receives the revising information and outputs an image corresponding to the optical module for displaying a three dimensional image; and
   a casing for accommodating the display panel, the optical module and the revising circuit;
   wherein the revising information is a pixel matrix information of n viewing angles, wherein n is an integral larger than 2, and
   wherein the pixel matrix information of n viewing angles is obtained from a sum of products of viewing angle information and a corresponding weight information, wherein the viewing angle information is in one of n viewing angle matrix tables, the n viewing angle matrix tables comprises n viewing angle information arranged repeatedly, the corresponding weight information is in one of n algorithm tables, the algorithm tables comprises a plurality of weighting information, the weighting information is related to the optical module.

10. The two dimensional/three dimensional (2D/3D) switchable display device according to claim 9, wherein the optical module is detachably mountable to the display panel.

11. The two dimensional/three dimensional (2D/3D) switchable display device according to claim 10, wherein the optical module is flexible and having a structure of curtain-type, track type, hang up type or flip type.

12. The two dimensional/three dimensional (2D/3D) switchable display device according to claim 10, wherein the optical module is a hard plate and having a structure of track type, hang up type or flip type.

13. The two dimensional/three dimensional (2D/3D) switchable display device according to claim 11, wherein the optical module is the curtain-type structure, and the two dimensional/three dimensional switchable display device further comprising:
   a coupling element being disposed at a corner of the casing, wherein the coupling element is used for coupling the optical module.

14. The two dimensional/three dimensional (2D/3D) switchable display device according to claim 9, wherein the optical module comprises a barrier plate or a lenticular lens.

15. The two dimensional/three dimensional (2D/3D) switchable display device according to claim 14, wherein the optical module moves relatively to the display panel for switching between the two dimensional/three dimensional (2D/3D) mode.

16. The two dimensional/three dimensional (2D/3D) switchable display device according to claim 9, wherein each of the viewing angle matrix tables comprises a plurality of positions, each of the pixel matrix information of n viewing angle matrixes comprises a value, the value is a sum of a product of one viewing angle information in a same position of each of the viewing angle matrix tables and the corresponding weighting information in each of the algorithm tables, the corresponding weighting information are different in each tables.

* * * * *